United States Patent [19]
McKinley et al.

[11] 3,901,872
[45] Aug. 26, 1975

[54] P-GLU-HIS-TRP-SER-TYR-D-PGL-LEU-ARG-PRO-GLY-NH$_2$ AND INTERMEDIATES

[75] Inventors: Wayne A. McKinley, Wallingford; Dimitrios Sarantakis, Audubon, both of Pa.

[73] Assignee: American Home Products Corporation, New York, N.Y.

[22] Filed: Mar. 13, 1974

[21] Appl. No.: 450,909

[52] U.S. Cl............................. 260/112.5; 424/177
[51] Int. Cl.$^2$................. C07C 103/52; A61K 37/26
[58] Field of Search................... 260/112.5; 424/177

[56] References Cited
OTHER PUBLICATIONS

Fujino et al.: Biochem. Biophys. Res. Comm., 57, 1248–1256 (1974).

Primary Examiner—Elbert L. Roberts
Assistant Examiner—Reginald J. Suyat

[57] ABSTRACT

D-Pgl$^6$-LRF, is described as well as its synthesis by solid phase techniques and novel intermediates formed by such synthesis. This novel decapeptide stimulates the release of luteinizing hormone and is useful in mammals in increasing and regulating fertility.

5 Claims, No Drawings

P-Glu-His-Trp-Ser-Tyr-D-Pgl-Leu-Arg-Pro-Gly-NH₂ AND INTERMEDIATES

This invention relates to the novel decapeptide p-Glu-Trp-Ser-Tyr-D-Pgl-Leu-Arg-Pro-Gly-NH$_2$, its process of manufacture and novel intermediates formed in such synthesis.

The luteinizing hormone releasing factor (hereafter called LRF) is the decapeptide, L-(5-oxoprolyl)-L-histidyl-L-tryptophyl-L-seryl-L-tyrosyl-glycyl-L-leucyl-L-arginyl-L-prolyl-glycine amide. See Matsuo et al., Biochem. & Biophy. Res. Comm. 46, pp 1334–1339 (1971). This decapeptide is secreted by the hypothalamus and carried to the adenohypophysis where it stimulates the release of the luteinizing hormone and the follicle stimulating hormone. The present invention concerns itself with structural modifications of LRF in which the glycine in the six position of the peptide chain has been replaced by D-phenylglycine. Monahan et al., Biochem. 12, pp 4616–4620 (November 1973) describe D-Ala⁶-LRF as stimulating release of luteinizing hormone.

The novel peptides of the present invention are represented by the compounds of the formula:

p-Glu-His-Trp-Ser-Tyr-D-Pgl-Leu-Arg-Pro-Gly-NH$_2$ and its non-toxic acid addition salts. The abbreviation "Pgl" stands for C-Phe.Gly or C.phenylglycine. All chiral amino acid residues identified in formula I supra, and the other formulas hereinafter are of the natural or L-configuration unless specified otherwise.

Also contemplated within the scope of the present invention are intermediates of the formula R⁴-p-Glu-His(N$^{im}$-R⁵)-Trp-Ser(R³)-Tyr(R²)-D-Pgl-Leu-Arg(N$^G$-R¹)-Pro-Gly-X   II wherein:
N$^G$ means the side chain nitrogen atoms of arginine;
N$^{im}$ means the nitrogen atoms of the imidazole ring of histidine;
R¹ is a protecting group for the N$^δ$, N$^ω$ and N$^{ω'}$ nitrogen atoms of arginine selected from the group consisting of nitro, tosyl, benzyloxycarbonyl, adamantyloxycarbonyl; and tert-butyloxycarbonyl; or R¹ is hydrogen which means there are no protecting groups on the side chain nitrogen atoms of arginine. Where the protecting group is nitro or tosyl, the protection is on either one of the N$^ω$, N$^{ω'}$ nitrogens and in the case of benzyloxycarbonyl, or adamantyloxycarbonyl, the protection is on the N$^δ$ nitrogen and either one of the N$^ω$, N$^{ω'}$ nitrogen atoms;

R² is a protecting group for the phenolic hydroxyl group of tyrosine selected from the group consisting of acetyl, tosyl, benzoyl, tetrahydropyranyl, tert-butyl, trityl, benzyl, 2,6-dichlorobenzyl, benzyloxycarbonyl and 4-bromobenzyloxycarbonyl. The preferred protecting group is 2,6-dichlorobenzyl or benzyl; or R² is hydrogen which means there is no protecting group on the phenolic hydroxy function;

R³ is a protecting group for the alcoholic hydroxyl group of serine and is selected from the group consisting of acetyl, benzoyl, tetrahydropyranyl, tert-butyl, trityl, benzyl, 2,6-dichlorobenzyl or R³ is hydrogen which means there is no protecting group on the alcoholic oxygen atom. Preferably R³ is benzyl;

R⁴ is preferably hydrogen but may also be an α-amino protecting group. The α-amino protecting group contemplated by R⁴ are those known to be useful in the art in the step-wise synthesis of polypeptides. Among the classes of α-amino protecting groups covered by R⁴ are (1) acyl type protecting groups illustrated by the following: formyl, trifluoroacetyl, toluenesulfonyl (tosyl), nitrophenylsulfenyl, etc.; (2) aromatic urethan type protecting groups illustrated by benzyloxycarbonyl and substituted Benzyloxycarbonyl such as p-chlorobenzyloxycarbonyl, p-nitrobenzyloxycarbonyl, p-bromobenzyloxycarbonyl, p-methoxybenzyloxycarbonyl; (3) aliphatic urethan protecting groups illustrated by tert-butyloxycarbonyl, diisopropylmethoxycarbonyl, isopropyloxycarbonyl, allyloxycarbonyl; (4) cycloalkyl urethan type protecting groups illustrated by cyclopentyloxycarbonyl, adamantyloxycarbonyl, cyclohexyloxycarbonyl; and d-isobornyloxycarbonyl; (5) thio urethan type protecting groups such as phenylthiocarbonyl; (6) alkyl type protecting groups as illustrated by triphenylmethyl (trityl), benzyl; (7) trialkylsilane groups such as trimethylsilane. The preferred α-amino protecting group defined by R⁴ are selected from the class consisting of benzyloxycarbonyl, tert-butyloxycarbonyl, tert-amyloxycarbonyl and d-isobornyloxycarbonyl;

R⁵ is a protecting group for the imidazole nitrogen atom selected from the group consisting of tosyl, benzyl, trityl, 2,2,2-trifluoro-1-benzyloxycarbonylaminoethyl and 2,2,2-trifluoro-1-tert-butyloxycarbonylaminoethyl or 2,4-dinitrothiophenyl.

In formula II at least one of R¹, R², R³ or R⁵ is a protecting group.

X is selected from the group consisting of NH$_2$, OH, O-(lower)alkyl in which (lower)alkyl is C$_1$ through C$_6$ (e.g., methyl, ethyl, pentyl, isopropyl, hexyl, etc.), O-benzyl and an anchoring bond used in solid phase peptide synthesis linked to a solid polystyrene resin support represented by one of the formulas:

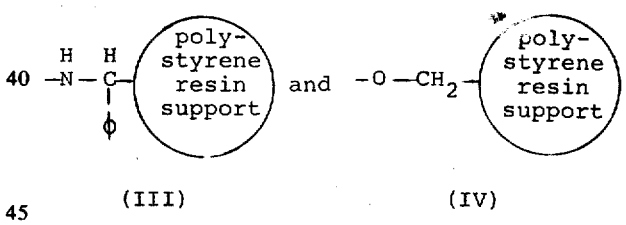

The polystyrene resin support is preferably a copolymer of styrene with about 1 to 2 percent divinyl benzene as a cross linking agent which causes the polystyrene polymer to be completely insoluble in most organic solvents. The polystyrene polymer is composed of long alkyl chains bearing a phenyl ring on every second carbon and the terminal amino acid residue (Gly) is joined through a covalent carbon to nitrogen or oxygen bond to these phenyl rings. The alkyl chains are cross linked at approximately every fiftieth carbon by p-substituted phenyl residues derived from divinyl benzene. In formula (III) the symbol φ means phenyl.

In selecting a particular side chain protecting group to be used in the synthesis of the peptides of formula (I), the following rules should be followed: (a) the protecting group must be stable to the reagent and under the reaction conditions selected for removing the α-amino protecting group at each step of the synthesis, (b) the protecting group must retain its protecting properties (i.e., not be split off under coupling conditions), and (c) the side chain protecting group must be removable upon the completion of the synthesis containing the desired amino acid sequence under reaction conditions that will not alter the peptide chain.

Illustrative of pharmaceutally acceptable, non-toxic salts of formula I are hydrochloride, hydrobromide, sulfate, phosphate, maleate, acetate, citrate, benzoate, succinate, malate, ascorbate, and the like.

The decapeptides of formulas (I) and (II) are prepared using solid phase synthesis. The synthesis is commenced from the C-terminal end of the peptide using an α-amino protected resin. Such a starting material can be prepared by attaching an α-amino protected glycine to a benzhydrylamine resin, a chloromethylated resin or a hydroxymethyl resin, the former being preferred. The preparation of benzhydrylamine resin is described by P. Rivaille et al., Helv. 54, 2772 (1971) and the preparation of the hydroxymethyl resin is described by Bodanszky et al., Chem. Ind (London) 38, 1597–98 (1966). A chloromethylated resin is commercially available from Bio Rad Laboratories Richmond, California and the preparation of such a resin is described by Stewart et al., "Solid Phase Peptide Synthesis" (Freeman & Co. San Francisco 1969), Chapter 1, pp 1–6. In using the benzhydrylamine resin an amide anchoring bond is formed with the α-amino protected glycine as follows:

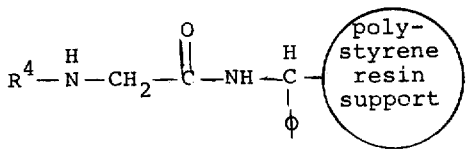

This permits the C-terminal amide function to be obtained directly after the amino acid sequence in the synthesis is complete by cleaving off the resin support to form the glycine amide at the C-terminal portion of the desired peptide of formula (I). When the other resins are used, the anchoring bond is the benzylester group as defined supra in formula (IV), which after cleavage of the peptide from the resin support must be converted to the C-terminal amide. The preferred procedure is to ammonalyse the protected peptide off the resin and then remove the protecting group by hydrogenolysis or by hydrogen fluoride cleavage. An alternate procedure would be to cleave by transesterification with methanol/(Et)$_3$N and then convert the resulting ester into an amide and subsequently deprotect as described above. See J. M. Stewart "Solid Phase Peptide Synthesis," pg, 42–46 (Freeman & Co. San Francisco 1969).

The α-amino protected glycine is coupled to the benzhydrylamine resin with the aid of a carboxyl group activating compound such as diisopropylcarbodiimide. Following the coupling of the α-amino protected glycine to the resin support, the α-amino protecting group is removed such as by using trifluoroacetic acid in dichloromethane, trifluoroacetic acid alone or HCl in dioxane. The deprotection is carried out at a temperature between about 0°C and room temperature. Other standard cleaving reagents and conditions for removal of specific α-amino protecting groups may be used as described in Schroder & Lubke, "The Peptides," 1 72–75 (Academic Press 1965). After removal of the α-amino protecting group the remaining α-amino protected amino acids are coupled step-wise in the desired order to obtain a compound of formula (I). However, as an alternate to adding each amino acid separately to the reaction, some of them may be coupled prior to addition of the solid phase reactor. Each protected amino acid or amino acid sequence, is introduced into the solid phase reactor in about a four-fold excess and the coupling is carried out in a medium of dimethylformamide: dichloromethane (1:1) or in dimethylformamide or dichloromethane alone. In cases where incomplete coupling occurs the coupling procedure is repeated before removal of the α-amino protecting group, prior to the coupling of the next amino acid to the solid phase reactor. The success of the coupling reaction at each stage of the synthesis is monitored by the ninhydrin reaction as described by E. Kaiser et al., Analyt. Biochem, 34, 595 (1970).

After the desired amino acid sequence has been synthesized, the peptide is removed from the resin support by treatment with a reagent such as hydrogen fluoride which not only cleaves the peptide from the resin but also cleaves all remaining side chain protecting groups and the α-amino protecting group (if present) on pyroglutamic acid to obtain directly a compound of formula I in the case where the benzhydrylamine resin was used. Where a chloromethylated resin is used the peptide may be separated from the resin by methanolysis after which the recovered product is chromatographed on silica gel and the collected fraction subject to ammonalysis to convert the methyl ester to the C-terminal amide. Any side chain protecting group may then be cleaved as previously described or by other procedures such as catalytic reduction (e.g., Pd on C) using conditions which will keep the Trp moiety intact. When using hydrogen fluoride for cleaving, anisole is included in the reaction vessel to prevent the oxidation of labile amino acid (e.g., tryptophan).

The solid phase synthesis procedure discussed supra is well known in the art and has been essentially described by M. Monahan et al., C. R. Acad. Sci, Paris, 273, 508 (1971).

The nomenclature used for peptides is described by Schroder & Lubke, supra, pp viii-xxix and in Biochemistry 11, 1726–1732 (1972).

The following examples are illustrative of the preparation of the compounds of formulas I and II.

EXAMPLE 1

L-Pyroglutamyl-N-$^{im}$-tosyl-L-histidyl-L-tryptophyl-O-benzyl-L-seryl-L-O-benzyl-L-tryosyl-D-phenylglycyl-L-leucyl-N$^{guan}$-tosyl-L-arginyl-L-prolylglycyl-benzhydrylamine resin Benzhydrylamine hydrochloride resin (30 g, 0.75 m equivalents of nitrogen per gram of resin) in a Merrifield vessel is treated two times with trifluoroacetic acid (5 min. each), and then washed with dichloromethane (2 times) and dimethylformamide (2 times). The resin is neutralized with 15 percent triethylamine in dichloromethane (2 treatments for 10 min. each) and washed with dichloromethane (4 times), methanol (3 times), and dichloromethane again (3 times). A solution of t-Boc-glycine (45 m moles) in dichloromethane is added to the vessel and shaken for 15 min., after which diisopropylcarbodiimide (45 m moles) is added and the shaking continued for 5 hours. The contents of the vessel are filtered off, the resin washed once with dichloromethane, and the vessel recharged as before and allowed to shake for 20 hours. The resin is washed with dichloromethane, dimethylformamide, 15 percent triethylamine in dichloromethane, dimethylformamide, dichloromethane (3 times), methanol (2 times), and a sample taken for amino acid analysis. The resin is found to be substituted to the extent of 0.30 m moles of t-Boc-glycine per gram of resin.

The remainder of the amino acids are added consecutively using the following procedure for deprotection and neutralization after each addition: (a) deprotection with three portions of 90 percent trifluoroacetic acid in dichloromethane for a total of 20 minutes, and then washed with dichloromethane (2 times) and dimethylformamide (2 times); (b) neutralization with two portions of 15 percent triethylamine in dichloromethane for a total of 14 minutes, and then washed with dimethylformamide (2 times), dichloromethane (2 times), methanol (3 times), and dichloromethane (3 times). A contact time of three minutes each is allowed except where indicated otherwise.

The amino acids are coupled in the following sequence: t-Boc-L-proline (45 m moles), t-Boc-$N^{guan}$-tosyl-L-arginine, (22.5 m moles), t-Boc-L-leucine (22.5 m moles), [at this point the resin is divided and only 5 grams of tetrapeptide resin is used for the remainder of the synthesis]T-Boc-D-phenylglycine (5 m moles), t-Boc-O-benzyl-L-tyrosine (5 m moles), t-Boc-O-benzyl-L-serine (5 m moles), t-Boc-L-tryptophan (5 m moles), t-Boc-$N^{im}$-tosyl-L-histidine (5 m moles), L-pyroglutamic acid (5 m moles).

All the couplings are done in dichloromethane or a mixture or dichloromethane and dimethylformamide (not less than 10:1), using diisopropylcarbodiimide (added in two portions over 30 minutes) at ambient temperature. After four hours the vessel is recharged with one half the original quantities of reactants and allowed to react an addditional twenty hours.

The resin is then washed two times with boiling methanol and dried in vacuo overnight.

EXAMPLE 2

L-Pyroglutamyl-L-histidyl-L-tryptophyl-L-seryl-L-tyrosyl-D-phenyl-glycyl-L-leucyl-L-arginyl-L-prolylglycinamide The above described preparation obtained in Example 1 is treated with anhydrous liquid hydrogen fluoride (30 ml) and anisole (15 ml) at 0°C for one hour. The hydrogen fluoride is then removed as quickly as possible under reduced pressure and the residue first washed with ether and then with 5 percent aqueous acetic acid. The acetic acid washes are lyophylized to leave the above titled product (1.29 gm).

EXAMPLE 3

Purification and characterization of L-pyroglutamyl-L-histidyl-L-tryptophyl-L-seryl-L-tyrosyl-D-phenylglycyl-L-leucyl-L-arginyl-L-prolylglycinamide The above titled crude product obtained in Example 2 is purified as follows: 1.29 gm of the product in 2 ml of 5 percent acetic acid is applied to a column (2.9 cm in diameter and 100 cm in height) with a bed of Sephadex G-25 (fine) previously equilibrated with 5 percent acetic acid and eluted with that solvent. Fractions of 4 ml each are taken. Analysis of the column effluent is carried out by use of the Folin-Lowry color reaction on every third fraction. Eight main peptide containing fractions A) 84-91 (116 mg), B), 92-96 (136 mg), C) 97-104 (124 mg), D) 105-110 (68 mg), E) 11-119 (147 mg), F) 120-139 (183 mg), G) 140-159 (107 mg), H) 160-180 (65 mg) are obtained. Fractions E, F, G, and H (502 mg) are shown by thin layer chromatography system BWP (3:1.5:2) (n-butanol : water : pyridine) to contain the same major material. They are combined and applied in 1 ml of the upper phase of BWA (4:5:1) (n-butanol : water : acetic acid) to a column (2.5 cm in diameter and 60 cm in height) of Sephadex G-25 (fine) previously equilibrated with first the lower phase and then the upper phase of the BWA system and eluted with the upper phase of that system. The column effluent is monitored as described before. Three main fractions are obtained: A) 40-47 (41 mg), B) 48-64 (113 mg), C) 84-105 (146 mg). Fraction C is the purest fraction as indicated by thin layer chromatography system BWP (3: 1.5: 2) (one main spot at $R_f$ .45, with trace amounts at $R_f$'s 0.62 and 0.15). Thin layer chromatograms are visualized with chlorine peptide spray. yield = 146 mg (8.3 percent) $[\alpha]_D^{25}$ =−53.71 (C = 1.05, 1 percent AcOH).

After hydrolysis of the peptide in 6 N HCl containing 4 percent thioglycolic acid for 20 hours at 110°C in a closed system under nitrogen, the following values for the amino acids are obtained: Glu 1.01, His 1.00, Trp .81, Ser 1.05, Tyr .92, C-Phe.Gly 102, Leu .92, Arg 1.01, Pro .75, Gly 1.00.

The compound of Example 3 was tested in vitro for its ability to increase the release of luteinizing hormone (LH). These tests are performed in rat tissue cultures, using the procedure described by Grant et al., Biochemical & Biophysical Research Communications, 51 pp 100-106 (1973) and the amount of hormone released is determined by radioimmunoassay in accordance with the method described by Berson et al., Metabolism, 13, 1135 (1964). The compound of Example 3 was found to stimulate LH release at a concentration as low as 0.05 ng/ml.

The compound of Example 3 has also demonstrated to have in vivo activity as a LH agonist as follows: Male rats weighing about 275 g were divided into groups of six. Initial blood samples were taken from the heart at time O and final samples at time 80 minutes. The compounds to be administered were injected subcutaneously at half doses at times O (immediately after bleeding) and time 60 minutes. The results appear in the table below:

Table II

| Compound | Total dose ng/rat | Plasma LH Initial | Final |
|---|---|---|---|
| LRF | 300 | 150±25 | 176±17 |
| Example 3 | 200 | 146±19 | 367±30* |

*significant at p <0.01.

The compounds of formula I can be administered to mammals intravenously, subcutaneously, intramuscularly or orally for increasing and regulating ovulation since LH is known to trigger ovulation in mammals [See Schally et al., Am. J. Obstet. Gynecol. pp 423-442, Oct. 1972]. The effective dosage will vary with the form of administration and the particular species of mammal to be treated. A typical dosage is a physiological saline solution containing a compound of formula I. Oral administration may be in either solid or liquid form.

What is claimed is:

1. A compound selected from the class consisting of

L-p-Glu-L-His-L-Trp-L-Ser-L-Tyr-D-Pgl-L-Leu-L-Arg-L-Pro-Gly-NH$_2$ (I)

and

R$^4$-L-p-Glu-L-His(N$^{im}$-R$^5$)-L-Trp-L-Ser(R$^3$)-L-Tyr(R$^2$)-D-Pgl-L-Leu-L-Arg(N$^G$-R$^1$)-L-Pro-Gly-X (II)

and its non-toxic salts; wherein

R$^1$ is a protecting group for the N$^\delta$, N$^\omega$ and N$^{\omega'}$ nitrogen atoms of arginine selected from the group consisting of nitro, tosyl, benzyloxycarbonyl, adamantyloxycarbonyl and tert-butyloxycarbonyl or R$^1$ is hydrogen;

R$^2$ is a protecting group for the phenolic hydroxyl group of tyrosine selected from the group consisting of acetyl, tosyl, benzoyl, tert-butyl, tetrahydropyranyl, trityl, benzyl, 2,6-dichlorobenzyl, p-bromobenzyloxycarbonyl and benzyloxycarbonyl or R$^2$ is hydrogen;

R$^3$ is a protecting group for the alcoholic hydroxyl group of serine and is selected from the group consisting of acetyl, benzoyl, tetrahydropyranyl, tert-butyl, trityl, 2,6-dichlorobenzyl and benzyl or R$^3$ is hydrogen;

R$^4$ is selected from the group consisting of hydrogen or an α-amino protecting group;

R$^5$ is a protecting group selected from the group consisting of tosyl, benzyl, trityl, 2,4-dinitrothiophenyl, 2,2,2-trifluoro-1-benzyloxycarbonylaminoethyl and 2,2,2-trifluoro-1-butyloxycarbonylaminoethyl; and X is selected from the group consisting of NH$_2$, OH, O-(lower)alkyl, O-benzyl and an anchoring bond linked to a solid polystyrene resin represented by one of the formula

 and

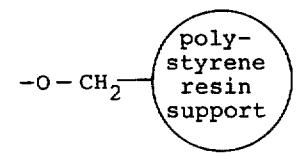

wherein said polystyrene resin is cross linked through the phenyl group on each second carbon atom of the alkyl chain of said polystyrene, with the proviso that at least one of R$^1$, R$^2$, R$^3$ and R$^5$ is other than hydrogen and wherein Pgl means phenylglycyl.

2. A compound according to formula II of claim 1 wherein X is NH$_2$.

3. A compound according to formula II of claim 1 wherein R$^4$ is hydrogen and X is

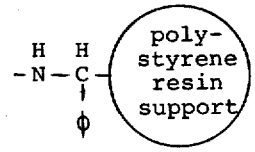

4. A compound according to claim 3 wherein R$^1$ is tosyl, R$^2$ is dichlorobenzyl, R$^3$ is benzyl and R$^5$ is tosyl.

5. A compound according to claim 1 which is selected from L-Pyroglutamyl-L-histidyl-L-tryptophyl-L-seryl-L-tyrosyl-D-C-phenylglycyl-L-leucyl-L-arginyl-L-prolyl-glycinamide and its non-toxic acid addition salts.

* * * * *